(12) United States Patent
Moshammer

(10) Patent No.: US 6,880,974 B2
(45) Date of Patent: Apr. 19, 2005

(54) LINEAR GUIDE

(75) Inventor: Horst Moshammer, Linz am Rhein (DE)

(73) Assignee: Igus Spritzgussteile für die Industrie GmbH, Cologne (DE)

( * ) Notice: Subject to any disclaimer, the term of this patent is extended or adjusted under 35 U.S.C. 154(b) by 1 day.

(21) Appl. No.: 10/127,992

(22) Filed: Apr. 22, 2002

(65) Prior Publication Data

US 2002/0181809 A1 Dec. 5, 2002

(30) Foreign Application Priority Data

Apr. 20, 2001 (DE) .......................................... 201 06 914

(51) Int. Cl.$^7$ ................................................. F16C 29/02
(52) U.S. Cl. ............................. 384/39; 384/40; 384/42
(58) Field of Search ............................. 384/39, 40, 42, 384/41, 26

(56) References Cited

U.S. PATENT DOCUMENTS

| | | |
|---|---|---|
| 3,259,020 A | 7/1966 | Walker |
| 4,653,937 A | 3/1987 | Lautenschlager |
| 4,702,621 A | 10/1987 | Heinonen et al. |

FOREIGN PATENT DOCUMENTS

| | | |
|---|---|---|
| DE | 19 54 508 U | 8/1966 |
| DE | 26 23 594 A1 | 12/1977 |
| DE | 35 05 614 A1 | 8/1986 |

OTHER PUBLICATIONS

Hoffman, Werkzeuge, pp. 252, (1981).

Primary Examiner—Leonard A. Footland
(74) Attorney, Agent, or Firm—Akin Gump Strauss Hauer & Feld, L.L.P.

(57) ABSTRACT

A linear guide comprises a linear guide comprises a rail having a plurality of running tracks, a carriage having at least one sliding element positioned opposite at least one of the running tracks, and an adjuster positioned between the at least one sliding element and the carriage. The sliding element has an inclined surface that faces away from the at least one running track and extends at an angle with respect to a travel direction of the carriage. The inclined surface has a plurality of first steps. The adjuster is shiftable in the travel direction and has an adjuster surface with a plurality of second steps that rest in shiftable fashion against the plurality of first steps. The adjuster is biased in a biasing direction against the sliding element such that the second plurality of steps can slide over the first plurality of steps as the sliding element moves in the travel direction.

13 Claims, 2 Drawing Sheets

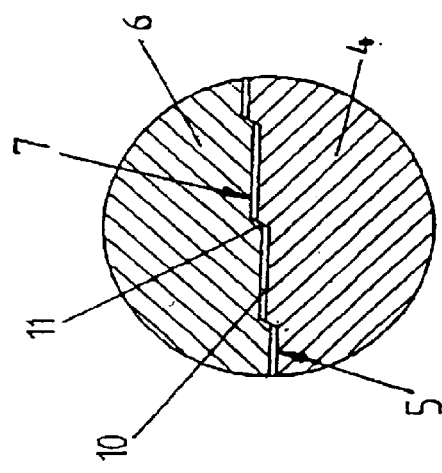
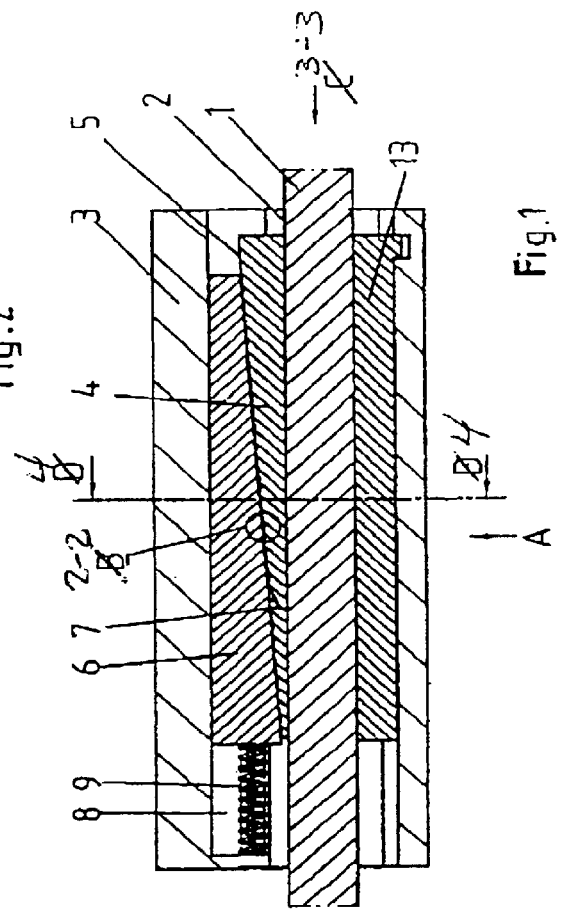
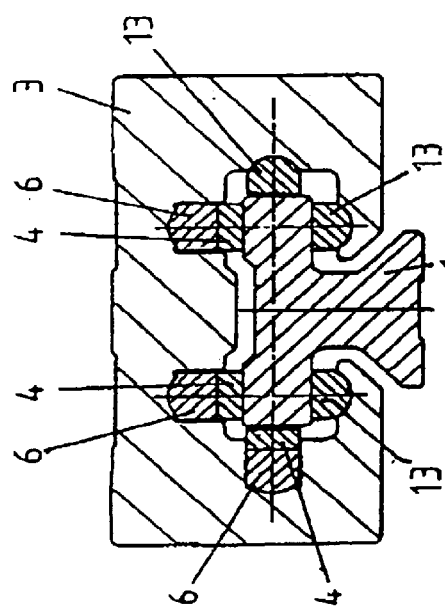
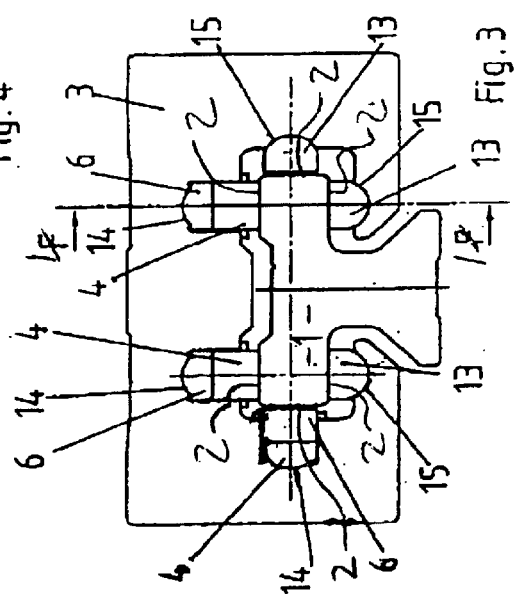

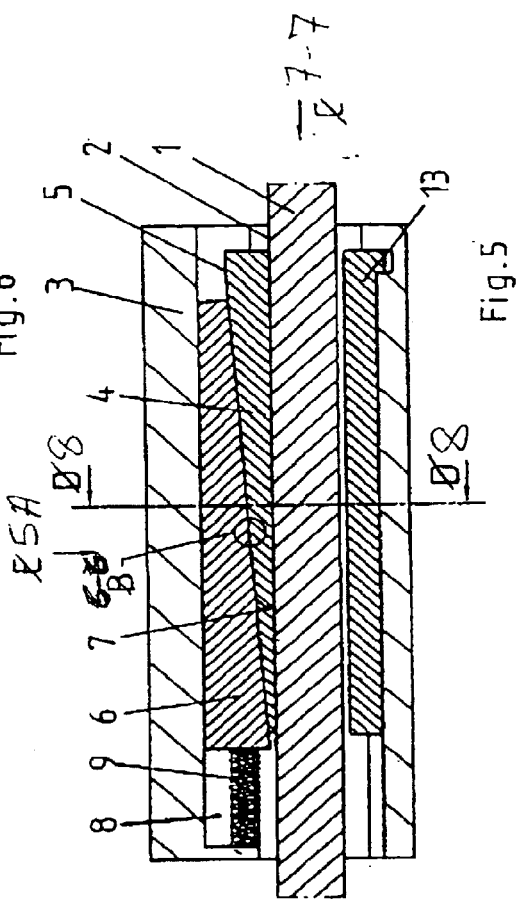
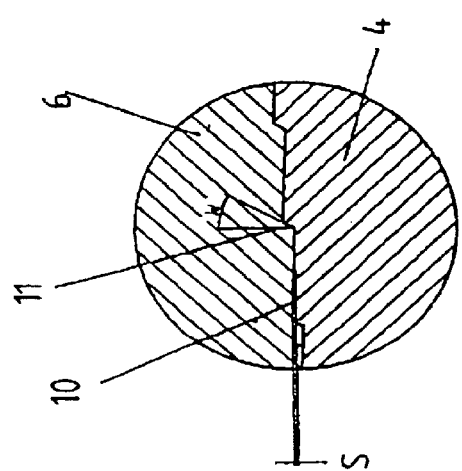
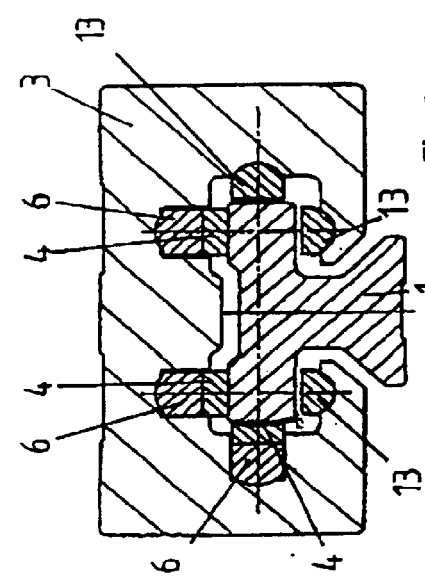
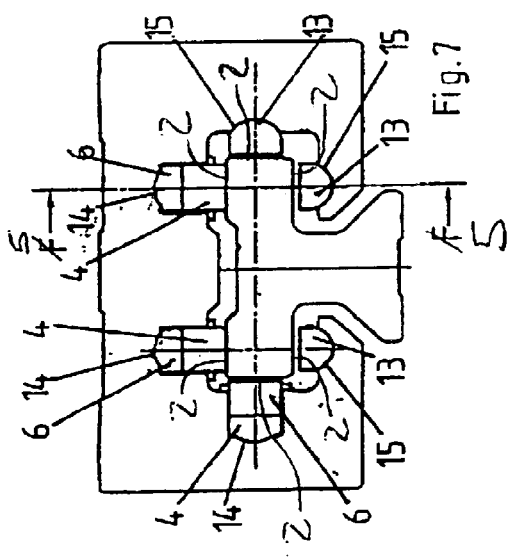

LINEAR GUIDE

TITLE OF THE INVENTION

Linear Guide

BACKGROUND OF THE INVENTION

The invention relates to a linear guide with a rail having a plurality of running tracks, and a carriage with at least one sliding element, which is opposite the running tracks and has a surface on the side facing away from the rail that is inclined relative to the travel directions of the linear guide, where an adjuster that is provided between the sliding element and the carriage can be shifted in the travel directions of the linear guide and has a surface resting in shiftable fashion against the inclined surface of the sliding element.

A linear guide of this kind is known from the applicant's "DryLin® T" catalogue of 8/98. It comprises an essentially T-shaped rail and a carriage with a correspondingly designed channel. The rail has two first pairs of running tracks that are opposite one another and perpendicular to the normal load direction of the carriage, and one second pair of running tracks that are opposite one another and perpendicular to the first running tracks. Sliding: elements made of a highly wear-resistant plastic with a low coefficient of friction are provided in the carriage opposite the running tracks. The sliding elements are wedge-shaped in construction with one surface that is next to the running track and normal to the load direction of the carriage, and an opposite inclined surface against which wedge-shaped adjusters can be pressed against. In order to adjust a clearance both in the normal load direction of the carriage and transverse thereto, the adjusters can be pressed against the inclined surface of the sliding elements by means of a set screw, whereby the associated sliding element, the wider end of which is opposite the set screw and against an abutment of the carriage, is moved towards the rail and thus reduces the clearance between the carriage and the rail at the corresponding bearing point By loosening the set screw, the clearance between the carriage and the rail can be increased at the corresponding bearing point. Expediently, the adjuster is pushed back by a compression spring when the set screw is loosened.

Instead of two running tracks, whose surface normals are opposite to the normal load direction of the carriage, the rail can, in case of smaller loads, also have just one centrally located running track and one corresponding sliding element opposite to it. In contrast to the arrangement described above, the wedge-shaped sliding elements can also be provided at other bearing points of the linear bearing where it is desirable to adjust the clearance.

In the known linear guides, the clearance is usually adjusted at the factory by the manufacturer. This pre-setting can be made on the basis of the displacement force of the carriage. In many cases, however, is it necessary for the customer to readjust the bearing clearance. Because three bearing points can be readjusted with the help of the set screws, this adjustment and control must be very precise. There is a risk of excessively increasing or decreasing the clearance of one of the bearing points during readjustment.

BRIEF SUMMARY OF THE INVENTION

An object of the present invention is to provide an improved linear guide of the kind described above, such that it is not necessary to adjust the bearing clearance of the linear guide by means of set screws or any other adjusting elements that have to be set by the manufacturer and/or customer.

According to the invention, a linear guide comprises a rail having a plurality of running tracks, a carriage having at least one sliding element positioned opposite at least one of the running tracks, and an adjuster positioned between the at least one sliding element and the carriage. The sliding element has an inclined surface that faces away from the at least one running track and extends at an angle with respect to a travel direction of the carriage. The inclined surface has a plurality of first steps. The adjuster is shiftable in the travel direction and has an adjuster surface with a plurality of second steps that rest in shiftable fashion against the plurality of first steps. The adjuster is biased in a biasing direction against the sliding element such that the second plurality of steps can slide over the first plurality of steps as the sliding element moves in the travel direction.

Preferably, the adjuster is pre-tensioned against the inclined surface of the sliding element, such that a force component results on the sliding element perpendicular to the running tracks opposite the sliding element. Due to the pre-tension and the corresponding clearance, the steps on the surface of the adjuster can slide over the steps on the inclined surface of the sliding element as it moves in the direction of the running tracks of the rail.

When there is excessive clearance, the steps on the surface of the adjuster slide over the corresponding steps on the sliding element until the clearance between the sliding element and the running rack of the rail is reduced to a minimum, such that the edges of the steps of both surfaces lie against one another. In this way, excessive clearance is reduced automatically, without requiring adjustment by means of a set screw or some other adjusting element.

Automatic adjustment of the clearance by the adjuster requires the carriage to be loaded such that the existing clearance results between the associated sliding element and the running track of the rail.

In a preferred configuration of the invention, the steps on the inclined surface of the sliding element have sections that are essentially parallel to the travel directions of the linear guide, and sections that rise at an angle of less than 90° in the direction of the pre-tension of the adjuster. In this context, the steps on the surface of the adjuster that is in contact with the inclined surface of the sliding element can be of corresponding construction.

The angle of the rising sections of the steps is preferably selected such that it is larger than the self-locking angle and smaller than the wedging angle.

In a preferred embodiment of the invention, the step sections running essentially parallel to the travel directions of the linear guide decline slightly in the direction of the pretension of the adjuster. Due to the decline of these sections, a minimum clearance always exists between the sliding element and the associated running track of the rail. If, because of its pre-tension, the adjuster slides over a step height equal to the remaining clearance between the sliding element and the associated running track of the rail, the clearance increases as the adjuster moves until the steps of the adjuster come up against the steps of the sliding element. The resulting self-adjusting minimum clearance is then equal to the depth of the declining slope of the step sections perpendicular to the travel directions of the linear guide.

Such automatic adjustment of a minimum clearance between the sliding elements and the running tracks of the rail is particularly advantageous when no additional elements of defined elasticity are present to ensure the existence of some clearance. In contrast, if compensation is provided by the system, the declining slope of the essentially horizontal step sections of the sliding element and the adjuster can be dispensed with.

If a declining slope is provided on the relevant step sections, its height perpendicular to the travel directions of the linear guide can be between 0.01 and 0.1 mm. Preferably, this height is between 0.01 and 0.05 mm.

In order to avoid self-locking of the step arrangement, the rising sections of the steps on the inclined surface of the sliding element or the adjuster can have a height perpendicular to the travel directions of the linear guide of between 0.02 and 0.2 mm. Preferably, this height is between 0.02 and 0.1 mm.

In order to pre-tension the adjuster, a compression spring can be provided that acts on it parallel to the travel directions of the linear guide. To save space, the compression spring is preferably arranged on the side of the adjuster and acts on a transverse projection on that side.

The contacting surfaces of the carriage, the adjuster and/or the sliding element can be of semi-cylindrical shape in order to compensate for non-parallelism of the bearing. For example, the inclined surface of the sliding element can be of semi-cylindrical shape and rest against a surface of the adjuster that has a correspondingly concave cross-section.

In another configuration, the surface resting against the sliding element, or an opposite surface of the adjuster that rests against the carriage, can be of semi-cylindrical shape.

The sliding element is preferably made of a highly wear-resistant plastic with a low coefficient of friction. Optimum results were achieved by pairing such a plastic for the sliding elements with anodized aluminum for the rail.

With regard to the configuration of the carriage and the sliding bearing, as well as the arrangement of the sliding pairs comprising a running track of the rail and a sliding element of the carriage, the linear guide can in all other respects be constructed like the known linear guides described above. In particular, the rail can have two first pairs of running tracks that are opposite one another and perpendicular to the normal load direction of the carriage, and one second pair of running tracks that are opposite one another and perpendicular to the first running tracks. The cross-section of the rail can be essentially T-shaped with a corresponding channel in the carriage, where the sliding pairs are expediently arranged symmetrically about the mid-perpendicular of the linear guide. Other configurations for the rail and carriage channel, and other arrangements of the sliding pairs can be used, if necessary for special load conditions.

In a standard configuration of the linear guide, the running tracks of the rails, whose surface normals are opposite to the normal load direction of the carriage, and one of the running tracks, whose surface normals are perpendicular to those of the former running tracks, are each assigned a sliding element with an inclined surface and a correspondingly configured adjuster.

In order to achieve self-adjustment of the clearance in an arrangement of this kind, the carriage must be loaded relative to the rail in a direction opposite to the normal load direction, so that the existing clearance results between the sliding elements with an inclined surface and the associated running tracks of the rail.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1 is a longitudinal sectional view of a linear guide taken along line 1—1 of FIG. 3 in accordance with the invention, with a carriage of the linear guide loaded in a direction A, FIG. 2 is an enlarged sectional view of area 2—2 in FIG. 1;

FIG. 3 is a front elevational view of the linear guide in a direction as represented by arrow 3—3 of FIG. 1;

FIG. 4 is a sectional view of the linear guide taken along line 4—4 of FIG. 1;

FIG. 5 is a longitudinal sectional view of the linear guide taken along line 5—5 of FIG. 7, with the carriage loaded in a direction as represented by arrow 5A;

FIG. 6 is an enlarged sectional view of area 6—6 in FIG. 5;

FIG. 7 is a front elevational view of the linear guide in a direction as represented by arrow 7—7 of FIG. 5; and FIG. 8 is a sectional view of the linear guide taken along line 8—8 of FIG. 5.

DETAILED DESCRIPTION OF THE INVENTION

Referring now to the drawings, and to FIGS. 1, 3 and 5 in particular, a linear guide in accordance with the present invention includes a rail 1 with a plurality of running tracks 2, and a carriage 3 with wedge-shaped sliding elements 4, which are opposite running tracks 2 and have a surface 5 on the side facing away from rail 1 that is inclined relative to the travel directions of the linear guide. Provided between each sliding element 4 and carriage 3 is an adjuster 6, which can be shifted in the travel directions of the linear guide. The adjuster 6 is of wedge-shaped construction like the sliding element 4, with one surface 7 of the adjuster 6 resting in shiftable fashion against the inclined surface 5 of the sliding element 4.

As is further shown in the drawings, the carriage 3 has generally square-shaped cut-outs 8 extending in the travel directions of the linear guide for accommodating the sliding element 4 and adjuster 6. The wedge-shaped sliding element 4 and adjuster 6 are arranged in such a cut-out 8 such that their inclined surfaces 5 and 7 rest against one another, with the top of adjuster 6 and the bottom of sliding element 4 being in parallel.

The largest face end of the sliding element 4 rests against an abutment (not shown) in carriage 3, while the adjuster 6 is pre-tensioned by a compression spring 9 in a travel direction of the linear guide that is toward the largest face end of the sliding element 4. Due to the pre-tension of the adjuster 6, a force component is applied to the sliding element 4 in a direction perpendicular to the running track 2 of the rail 1.

As shown in more detail in FIGS. 2 and 6, the contacting surfaces 5 and 7 of the sliding element 4 and adjuster 6 have corresponding steps, where, given appropriate clearance, the steps of the surface 7 of the adjuster 6 can, due to its pre-tension, slide over the steps of the inclined surface 5 of the sliding element 4. In a load direction A shown in FIG. 1, the adjuster 6 is pushed over the steps of the sliding element 4 until the remaining bearing clearance is less than the step height. In this context, the adjuster 6 is arranged such that, over its possible travel path, its bottom side does not hit the rail 1, and its smallest face end does not hit the abutment (not shown) for the sliding element 4.

As shown in more detail in FIG. 2, the steps on the inclined surface 5 of the sliding element 4 or on the adjuster 6 have sections 10 that are essentially parallel to the travel directions of the linear guide, and sections 11 that rise at an angle W of less than 90° with respect to the pre-tension direction of the adjuster 6. The angle W of the rising sections 11 is selected such that it is larger than the self-locking angle and smaller than the wedging angle of the linear guide arrangement.

As shown in detail in FIG. 6, the sections 10, running essentially parallel to the travel directions of the linear guide, decline slightly in the pre-tension direction of the adjuster 6. As a result, if the remaining bearing clearance is zero and the step edges of the surface 7 of the adjuster 6 slide over the step edges of surface 5 of the sliding element 4, a minimum clearance S, as indicated in FIG. 6, results when the adjuster 6 is shifted further to the next step section due to the pre-tension. This measure ensures that a minimum clearance of S always results when the clearance of the linear guide adjusts automatically.

FIGS. 3, 4 and 7, 8 show the arrangement of the sliding pairs on the rail 1 and the carriage 3, which comprise sliding element 4 and running track 2 of the rail 1. The rail 1 and carriage 3 are of essentially symmetrical design, where the rail 1 is T-shaped and the carriage 3 has a correspondingly shaped channel 12. The rail 1 has two first pairs of running tracks 2 that are opposite one another and perpendicular to the normal load direction A of the carriage 3, and a second pair of running tracks 2 that are opposite one another and perpendicular to the first running tracks. For the purpose of automatically adjusting vertical and lateral bearing clearances, the running tracks 2, whose surface normals are opposite to the normal load direction A of carriage 3, and one of the lateral running tracks are each assigned a sliding element 4 of the kind described above with the inclined surface 5 and a corresponding adjuster 6. The other running tracks are assigned essentially square-shaped sliding elements 13, which are secured against displacement in the carriage 3.

The surfaces 14 of the adjusters 6, which rest against the carriage, and the surfaces 15 of the sliding elements 13, which rest against the carriage 3, are of semi-cylindrical shape in order to compensate for non-parallelism in the linear guide by means of corresponding rotation of the sliding elements 4 and 13.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as: defined by the appended claims.

I claim:

1. A linear guide comprising:

a rail having a plurality of running tracks;

a carriage having at least one sliding element positioned opposite at least one of the running tracks, the sliding element having an inclined surface facing away from the at least one running track that extends at an angle with respect to a travel direction of the carriage, the inclined surface having a plurality of first steps; and an adjuster positioned between the at least one sliding element and the carriage, the adjuster being shiftable in the travel direction and having an adjuster surface with a plurality of second steps resting in shiftable fashion against the plurality of first steps, the adjuster being biased in a biasing direction against the sliding element such that the second plurality of steps can slide over the first plurality of steps as the sliding element moves in the travel direction.

2. The linear guide according to claim 1, wherein the first plurality of steps have first step sections that are generally parallel to the travel direction, and second step sections that extend at an angle of less than 90° with respect to the biasing direction.

3. The linear guide according to claim 2, wherein the first step sections decline slightly in the biasing direction.

4. The linear guide according to claim 3, wherein the first step sections decline over a height of between 0.01 and 0.1 mm perpendicular to the travel direction.

5. The linear guide according to claim 4, wherein the first step sections decline over a height of between 0.01 and 0.05 mm perpendicular to the travel direction.

6. The linear guide according to claim 2, wherein the second step sections have a height perpendicular to the travel direction of between 0.02 and 0.2 mm.

7. The linear guide according to claim 6, wherein the second step sections have a height perpendicular to the travel direction of between 0.02 and 0.1 mm.

8. The linear guide according to claim 1, and further comprising a compression spring for biasing the adjuster parallel to the travel direction.

9. The linear guide according to claim 1, wherein the adjuster surface is concave and the inclined surface of the sliding element is of semi-cylindrical shape and rests against the concave adjuster surface.

10. The linear guide according to claim 1, wherein the adjuster has a further surface opposite the adjuster surface that rests against the carriage, and further wherein at least one of the adjuster surface and the further surface is of semi-cylindrical shape.

11. The linear guide according to claim 1, wherein the sliding element is made of a highly wear-resistant plastic with a low coefficient of friction.

12. The linear guide according to claim 1, wherein the rail has two first pairs of running tracks that are opposite one another and extend perpendicular to a normal load direction of the carriage, and one second pair of running tracks that are opposite one another and extend perpendicular to the first running tracks.

13. The linear guide according to claim 12, wherein one of the running tracks from each first pair of opposite running tracks has a first surface that is oriented normal to the carriage load direction, and one of the second pair of running tracks has a second surface, and further wherein the sliding element and the adjuster are associated with each of the first and second surfaces.

* * * * *